(12) United States Patent  
Radomski et al.

(10) Patent No.: US 11,738,877 B2  
(45) Date of Patent: Aug. 29, 2023

(54) SEAL ASSEMBLY

(71) Applicant: ROLLS-ROYCE plc, London (GB)

(72) Inventors: Steven A Radomski, Derby (GB); Richard G Stretton, Derby (GB)

(73) Assignee: ROLLS-ROYCE PLC, London (GB)

( * ) Notice: Subject to any disclaimer, the term of this patent is extended or adjusted under 35 U.S.C. 154(b) by 691 days.

(21) Appl. No.: 16/832,607

(22) Filed: Mar. 27, 2020

(65) Prior Publication Data

US 2020/0317354 A1    Oct. 8, 2020

(30) Foreign Application Priority Data

Apr. 4, 2019    (GB) ...................................... 1904727

(51) Int. Cl.
*B64D 27/26* (2006.01)
*F16J 15/10* (2006.01)
(Continued)

(52) U.S. Cl.
CPC ................ *B64D 27/26* (2013.01); *B64C 7/00* (2013.01); *F01D 11/005* (2013.01);
(Continued)

(58) Field of Classification Search
CPC .... F16J 15/00; F16J 15/02; F16J 15/06; F16J 15/10; F16J 15/102; F16J 15/104;
(Continued)

(56) References Cited

U.S. PATENT DOCUMENTS 4,703,937 A * 11/1987 Chrzanowski ......... F16J 15/166
277/584

10,233,765 B2    3/2019 Yagi
(Continued)

FOREIGN PATENT DOCUMENTS

EP    2 505 790 A2    10/2012
EP    3048260 A1    7/2016
(Continued)

OTHER PUBLICATIONS

Jun. 3, 2020 extended Search Report issued in European Patent Application No. 20165185.8.
Combined Search and Examination Report of the Intellectual Property Office of the United Kingdom for GB1904727.3 with search date of Sep. 18, 2019 and report date of Sep. 19, 2019.

*Primary Examiner* — Nathan Cumar
(74) *Attorney, Agent, or Firm* — Oliff PLC

(57) ABSTRACT

A seal assembly for a gas turbine engine having a rotor arranged to rotate about an axis in use. The seal assembly has a static support structure for the gas turbine engine and a casing structure of the engine. Rotation of the engine rotor causes a deflection of the casing structure relative to the static support structure in a first direction. A seal is provided at an interface between the static support structure and the casing structure, and comprising a first seal portion and a second seal portion spaced from one another in the first direction. The first seal portion is provided against a first surface of the casing structure and the second seal portion is provided against a second surface of the casing structure opposing the first surface. In an at-rest state in which the engine is not operational, the first and second surfaces are offset from an equilibrium position with respect to the static support structure such that there is a difference in compression of the first seal portion and the second seal portion between the static support structure and the casing structure. The offset is in a direction opposite to the first direction.

16 Claims, 3 Drawing Sheets

(51) Int. Cl.
*B64C 7/00* (2006.01)
*F01D 11/00* (2006.01)

(52) U.S. Cl.
CPC ....... *F16J 15/102* (2013.01); *B64D 2027/262* (2013.01); *F05D 2240/55* (2013.01)

(58) Field of Classification Search
CPC ........ F16J 15/106; B64D 27/00; B64D 27/26; B64D 2027/262; B64D 2027/266; B64D 2027/268; B64C 7/00; B64C 7/02; F01D 11/00; F01D 11/005; F01D 11/006; F05D 2240/00; F05D 2240/55; F05D 2240/57; F05D 2240/58; F05D 2240/581
USPC ........................................................ 277/345
See application file for complete search history.

(56) References Cited

U.S. PATENT DOCUMENTS

| | | | |
|---|---|---|---|
| 2007/0253809 A1* | 11/2007 | Glynn | F01D 11/04 415/174.2 |
| 2011/0135453 A1* | 6/2011 | Howes | F16J 15/3292 415/171.1 |
| 2012/0248707 A1* | 10/2012 | Dixon | F01D 11/04 277/412 |
| 2016/0194971 A1 | 7/2016 | Yagi | |
| 2018/0266263 A1 | 9/2018 | Jacon et al. | |

FOREIGN PATENT DOCUMENTS

| | | |
|---|---|---|
| GB | 2562582 A | 11/2018 |
| WO | 83/003881 A1 | 11/1983 |

\* cited by examiner

SEAL ASSEMBLY

CROSS-REFERENCE TO RELATED APPLICATIONS

This specification is based upon and claims the benefit of priority from United Kingdom patent application number GB 1904727.3 filed on Apr. 4, 2019, the entire contents of which are incorporated herein by reference.

BACKGROUND

Field of the Disclosure

The present disclosure relates to seal assembly, particularly to a seal assembly for a gas turbine engine.

Background of the Disclosure

In some conventional gas turbine engines, the connection between a core of the engine and a fan casing is provided by a plurality of 'A-frames' extending between the core and the fan casing. The structure of the A-frames accommodates relative vertical, lateral and torsional loads between the core and the casing via compression and/or tension of each arm of the A-frame.

In other gas turbine engine configurations, A-frames are not used and support between the core casing and the nacelle (fan casing) is provided by a single row of outlet guide vanes (OGVs) downstream of the fan.

Operation of a gas turbine engine results in roll torque being applied to the fan casing/nacelle. The roll torque is a result of the aerodynamic loads on the OGVs coupled with any external loads applied to the external fan casing e.g. from fan case engine mount link loads.

Typically, the aerodynamic gas loading can be assumed to be applied at mid height of the OGVs, and equal to the fan shaft torque.

In a geared fan engine, the bypass ratio is increased, thus increasing the distance between the core casing and the nacelle, along with the aerodynamic loading on the OGVs. The geared turbo fan can also be characterised by a slower fan speed and higher LP torque. These factors increase the roll torque wind-up in the outlet guide vanes extending between the core and the nacelle.

The greater torque in the outlet guide vanes leads to a greater angular displacement of the fan casing/nacelle in use. Significant additional mass is needed to strengthen the larger span of the OGV's and to resist torque wind-up, i.e. to prevent excessive angular displacement of the nacelle.

The engine is attached to the aircraft, e.g. beneath the wing, via a rigid pylon, which resists any torque wind-up in the engine. A seal is located between the pylon and the nacelle. An increased angular displacement of the nacelle causes a need to seal a larger gap at any adjoining pylon or nacelle to engine interface.

It is an objective of the present disclosure to mitigate one or more of the above problems. It may be considered an additional or alternative aim to provide an improved seal offering a seal interface that is more tolerant to mechanical and/or thermal deflections.

SUMMARY OF THE DISCLOSURE

According to a first aspect there is provided a seal assembly for a gas turbine engine having a rotor arranged to rotate about an axis in use, the seal assembly comprising: a static support structure for the gas turbine engine; a casing structure of the engine, wherein rotation of the engine rotor causes a deflection of the casing structure relative to the static support structure in a first direction; and a seal at an interface between the static support structure and the casing structure, and comprising a first seal portion and a second seal portion spaced from one another in the first direction, wherein the first seal portion is provided against a first surface of the casing structure and the second seal portion is provided against a second surface of the casing structure opposing the first surface; where in an at-rest state in which the engine is not operational, the first and second surfaces are offset from an equilibrium position with respect to the static support structure such that there is a difference in compression of the first seal portion and the second seal portion between the static support structure and the casing structure, said offset being in a direction opposite to the first direction.

There is also provided a gas turbine engine for an aircraft comprising the seal assembly of the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above. The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm or 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being) $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
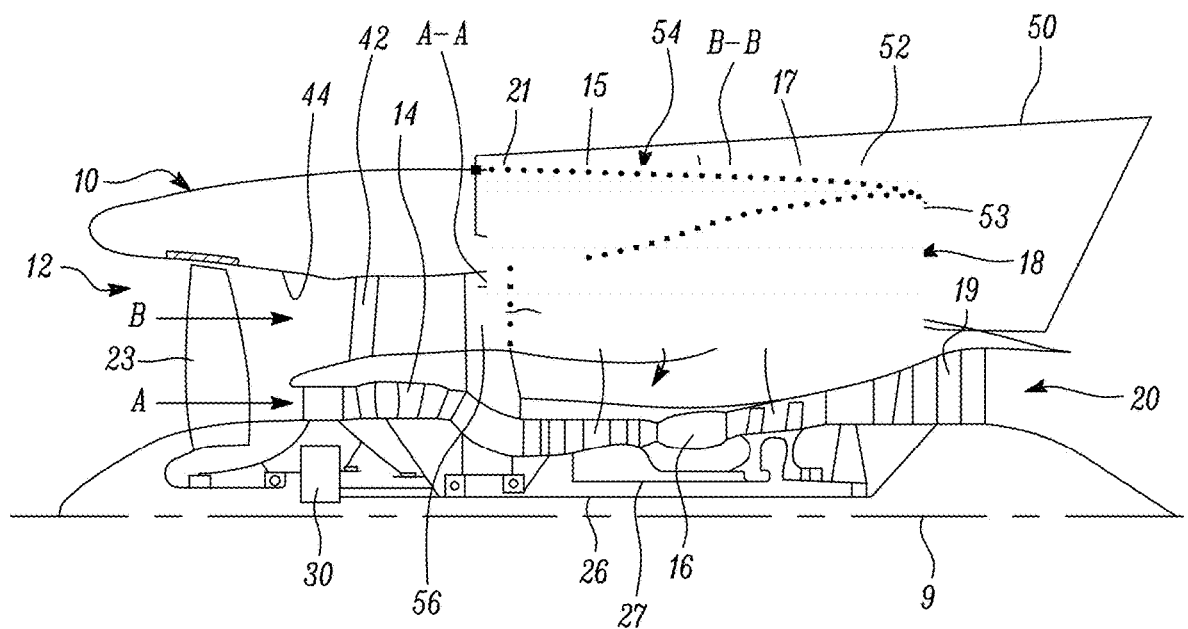
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
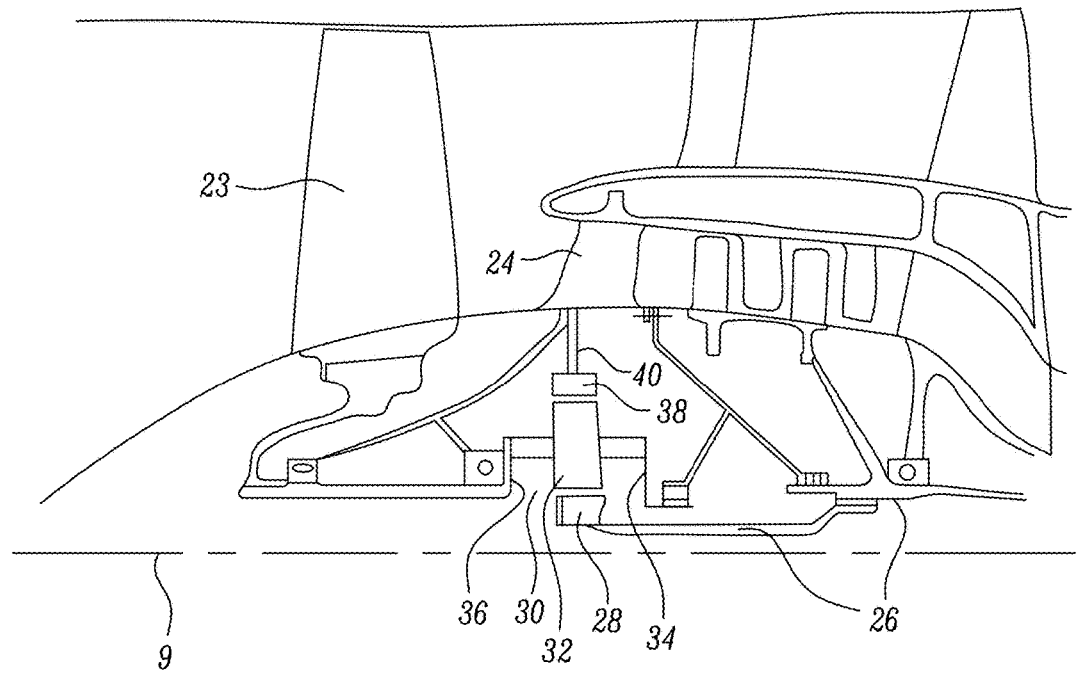
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
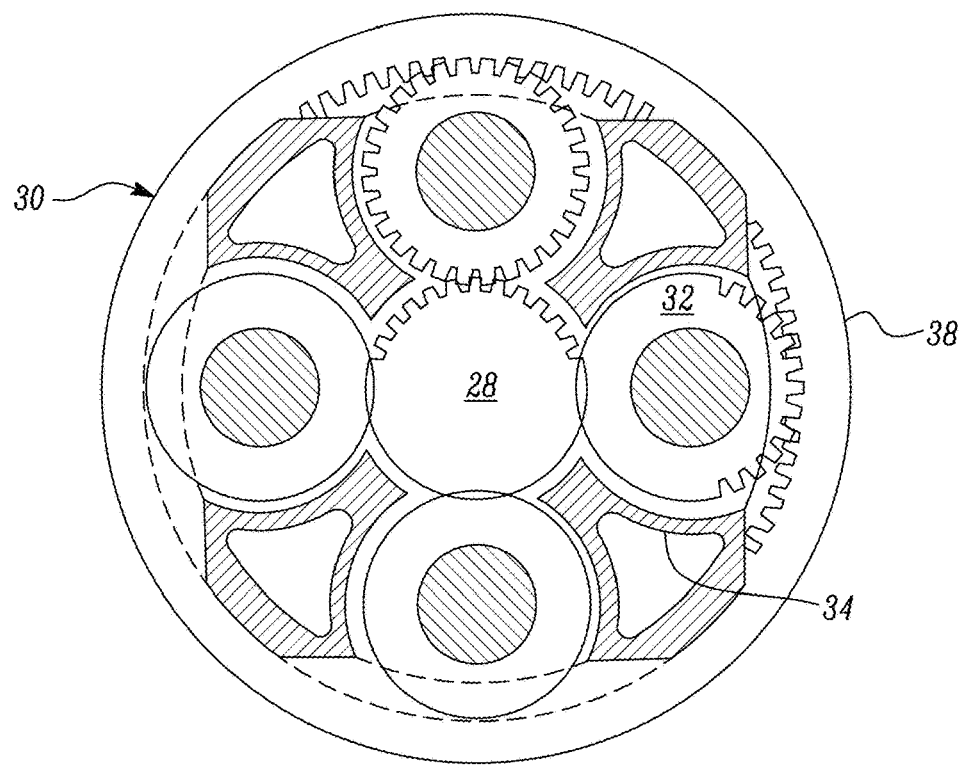
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The engine core 11 and the fan assembly 23 are connected to and supported by the nacelle 21 via a plurality of structural vanes 56 disposed circumferentially around the engine core. In the illustration, there are also some aerodynamic fan outlet guide vanes or OGVs 42 extending between an outer edge of the core 11 (e.g. the core casing) and the inner surface 44 of the nacelle (e.g. the fan casing). The OGVs 42 support the engine core 11 and prevent relative movement/rotation of the engine core 11 with respect to the nacelle.

In some instances, the aerodynamic vanes 42 and the structural vanes 56 are combined into a single array, e.g. in a common plane and/or as a common spoked structure, which performs both the structural connection between the fan case and the core, and the aerodynamic function of removing the swirl of the flow from the fan.

Figure 4:
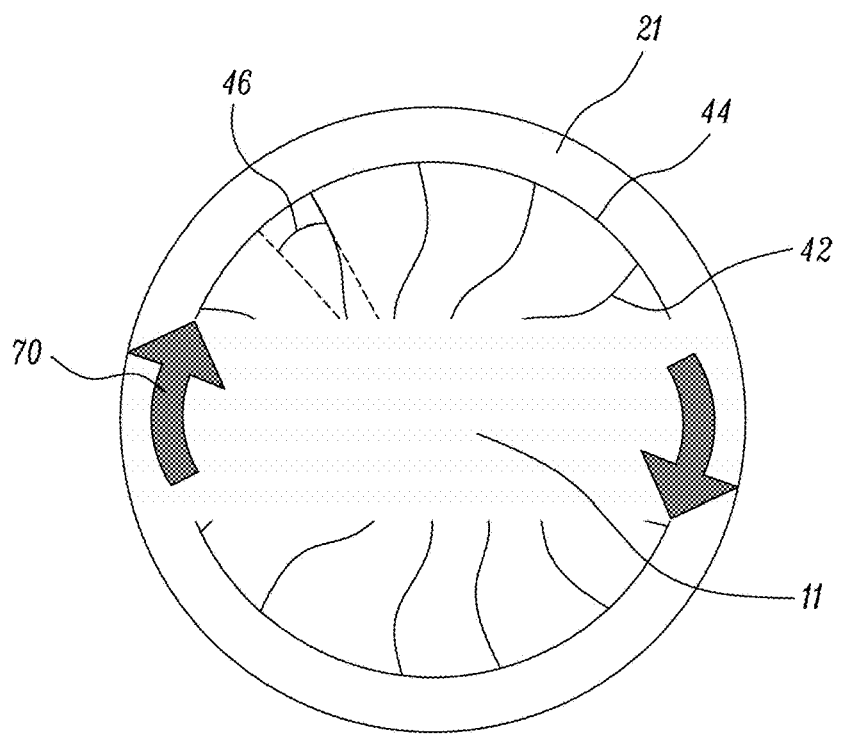
FIG. 4 is a front view on the OGVs

As shown in FIG. 4, during operation of the engine (i.e. during a mobile state), the rotation of the fan 23 and/or the engine core 11 components and aerodynamic loads on the OGVS 42 create a reactive torque in an opposing direction to the rotation. Typically, the reactive torque is unidirectional. The reactive torque is transferred to the OGVs 42, thereby causing an angular/circumferential deflection of the OGV 42 by an angle 46 relative to when the engine is not in operation (i.e. in a static state). The rotation of the OGVs 42 results in a corresponding slight rotation of any structure mounted to the engine OGVs or outer fan case, relative to any structure mounted from the pylon structure 50. The circumferential movement (or torque wind-up) may also be accompanied by an axial displacement of the fan case due to the resulting deflection of the supporting OGV struts.

FIG. 1 shows the engine supported by a pylon 50. The pylon 50 attaches the engine to a wing of an aircraft. The pylon 50 is attached to the engine through the nacelle 21 and a lower portion of the pylon 50 thus supports the core 11 via the OGVs 42 and a splitter/bifurcation 56.

As an example, during engine operation, the angular deflection of the OGVs 42 causes a deflection of the nacelle 21 relative to the pylon 50. Such a deflection can lead to large displacements at the interface between the nacelle 21 and the pylon 50, i.e. including the splitter 56.

Due to the increased-height bypass duct of the geared turbine engine, the distance between the engine core 11 and the inner surface 44 of the nacelle is increased relative to a conventional engine. This increases the radial length of the OGVs 42 and therefore increases the circumferential distance the radial outer ends of the OGVs 42 rotate for a given angular deflection. This, therefore, increases the circumferential distance the nacelle rotates relative to the pylon 50 unless steps are taken to counteract the deflection by increasing engine structural stiffness (and weight).

An interface between a static structure and a gas turbine engine is shown in dashed lines in FIG. 1.

The interface comprises a first portion 47 located between a lower portion of a pylon 50 and the bifurcation/splitter 56 of a gas turbine engine. The first interface portion 47 extends in a generally radial direction between the engine core 11 and the nacelle 21.

The interface comprises a second portion located between the pylon 50 and nacelle 21. The second portion may extend along an upper/outer interface 52 formed between an upper/outer surface of the nacelle and the pylon 50. The second portion may additionally or alternatively extend along a lower/inner interface 53 formed between the lower/inner surface 44 of the nacelle and the pylon 50.

The interface comprises a seal 54 configured to accommodate the relative movement between the engine and the pylon 50.

In an example, the seal 54 extends along the first interface portion 47 between the lower portion of the pylon and an adjacent portion of the splitter 56.

Additionally or alternatively, the seal 54 extends along the second portion 52, 53 of the interface between the nacelle 21 and the pylon 50.

Figure 5:
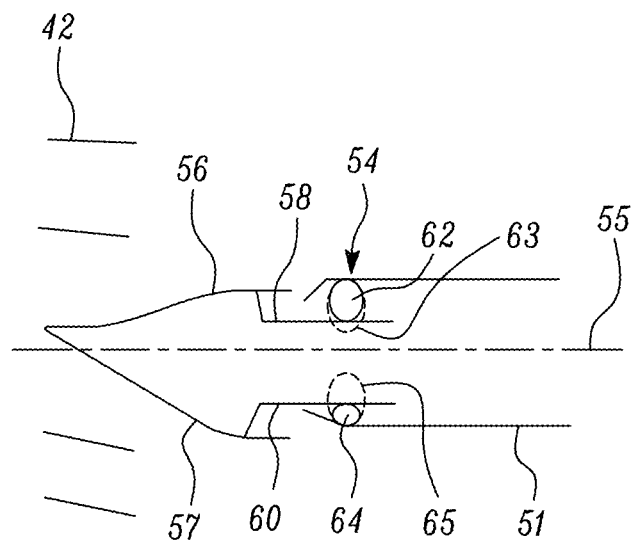
FIG. 5 is a schematic sectional view on a seal interface with offset cold build

FIG. 5 shows a cross-section of the seal 54 at plane A-A of FIG. 1 in a static state or 'cold build' state when a rotor (for example, the fan assembly) is not rotating. The present example will be described in terms of the seal 54 at the first interface portion 47 (at A-A). However, it can be appreciated the described features will perform substantially the same technical function throughout the seal 54, for example, at the second interface portion between the nacelle 21 and the pylon 50 (at B-B shown in FIG. 1).

In this example, the seal 54 is provided on the splitter/bifurcation 56 of the bypass duct. The bifurcation structure 56 comprises a frontal portion 57 mounted to the core 11 and extending over the span of the OGVs, and a rear member/portion 51 depending from the pylon 50. The front portion 57 can thus move in use relative to the static rear member 51 due to angular deflection in the manner described above. The seal 54 is provided between the front portion 57 and rear member 51 and accommodates the relative deflection.

The front portion comprises a first member 58 and a second member 60. The first member 58 and second member 60 extend from an inner surface of the bifurcated structure and in a direction generally parallel to the axis of rotation 9. The first 58 and second 60 members depend inside the bifurcation to provide opposing brackets or lands against which opposing seal portions 62 and 64 can be located. The first and second members may comprise walls, e.g. internal walls.

The first and second members are located on opposing sides of a central axis 53 of the splitter 56 and have opposing faces, facing away form said axis 53 for location of the respective seal portions 62 and 64. The central axis 53 may be parallel with the axis of rotation 9.

A plurality of OGVs 42 are shown. The OGVs 42 are spaced about the splitter 56 in the plane of rotation of the rotor (it is appreciated the further OGVs would not be visible at the seal 54 if located at the interface between the nacelle 21 and the pylon 50). The front/tip of the splitter 56 is within the plane of the row of the OGVs 42 in this example, i.e. amongst the OGVs 42. However, the OGVs 42 could otherwise be axially spaced from (i.e. in front of) the splitter 56 in other arrangements.

The interface between pylon 50 and front portion 57 comprises the first seal portion 62 and the second seal portion 64, which collectively provide the seal 54. The seal portions are located in the static member 51 depending from the lower portion of the pylon 50.

The seal portions are located adjacent a so-called 'eagle beak' structure of the splitter 56.

The first seal portion 62 and the second seal portion 64 extend in a generally radial direction and are spaced from one another in a direction perpendicular/lateral to the axis of rotation 9 and the central axis 53. The first and second seal portions extend fully or partially along the length of the interface between the static member 51 of the pylon and the frontal portion 57 of the splitter 56. The seal may extend in a direction parallel with the length/height (not shown) of the splitter 56.

Whilst the first and second seal portions are depicted as being substantially circular in section for simplicity, it is appreciated they make take and sectional form or profile necessary to provide an effective seal. (e.g. omega, p-seal, d-seal or blade or finger seals)

The first and second seal portions are resiliently deformable. In an example, the first and seal portions comprise e.g. silicon rubber. Depending on the design requirements of the seal makeup, metallic or composite inserts could also be included, e.g. with low friction or wear resistant coatings.

The first member 58 and the second member 60 are located in between the first seal portion 62 and the second seal portion 64. The first member 58 engages the first seal portion 62, and the second member 60 engages the second seal portion 64. The first and second member are free to move relative to the static structure 51 in the plane of rotation of the rotor (i.e. in a direction circumferential or perpendicular to the central axis 53) to permit relative movement (i.e. angular displacement) between the nacelle 21 and/or front portion 57 relative to the pylon 50.

In some examples, the bifurcation comprises a single member which engages both the first seal portion 62 and the second seal portion 64, i.e. on opposing sides thereof, instead of the first and second members 58 and 60.

The first and second member compress the first seal portion 62 and the second seal portion 64 respectively against the opposing sides of the static member 51. The dashed lines show the size of the first seal portion 63 when at rest and the size of the second seal portion 65 when at rest. As can be seen from FIG. 6, the first and second seal portion are compressed by uneven amounts, e.g. to different nominal sizes, when the engine is at rest.

The distance between the first member 58 and the central axis 53 of the static member is different to the distance between the second member 60 and the central axis 53 of the static member (i.e. the front/moveable portion of the splitter is offset relative to the static member 51 of the pylon), such that the nominal compression of the first seal portion 62 is different from the nominal compression of the second seal portion 64. The offset has a magnitude of 0.1-15 mm.

The offset is configured to be in an opposing direction to the direction of the relative movement between the splitter and static structure 51 during operation of the engine. For example, if the splitter moves in an upward direction relative to the static structure 51 during operation, in the orientation of FIGS. 5 and 6, the offset is configured to extend in a downward direction when the engine is at rest, i.e. with the lower seal compressed to a greater degree. That is to say, when at-rest the seal that is upstream in the direction of fan rotation is compressed to a greater extent.

The magnitude of the offset may vary across the seal. In an example, the magnitude of the offset increases in proportion to the radial distance of the seal from the axis 9 and/or the engine core 11. For example, a seal portion close to the core casing will have a smaller offset compared with a seal further from the core casing, i.e. closer to the nacelle. Likewise, the gap between the aerodynamic surfaces at the interface can be varied along the span of the interface so that the surfaces match at the desired operating condition, e.g. cruise, to improve performance.

In an example, the offset in the seal 54 at the radially inner end of the splitter, e.g. at the inner wall of the bypass duct, could be substantially zero and the offset in the seal 54 between the nacelle 21 and the pylon 50 is 5-11 mm.

A varying seal thickness/profile along its length could be used to this end.

The nominal compression of the first seal portion 62 is 10-35%, or 10-20%, preferably around 15%, in the static state. This seal would be compressed further due to the operational mechanical and thermal deflections. The nominal compression of the second seal portion 64 is 35-60%, or 45-60%, preferably around 55%, in the static state. The compression in this seal would be reduced as a result of the operational mechanical and thermal deflections.

The difference in nominal compression of the first seal portion 62 and second seal portion 64 is 5-50%, or 20-50%, preferably, 40% in the static state.

In the manner disclosed above, the engine core 11 and splitter/OGVs are mounted to the pylon at a slight angular offset (when at rest) to counteract, at least in part, the expected angular offset between the core 11 and pylon 50 caused by operation of the engine.

Figure 6:
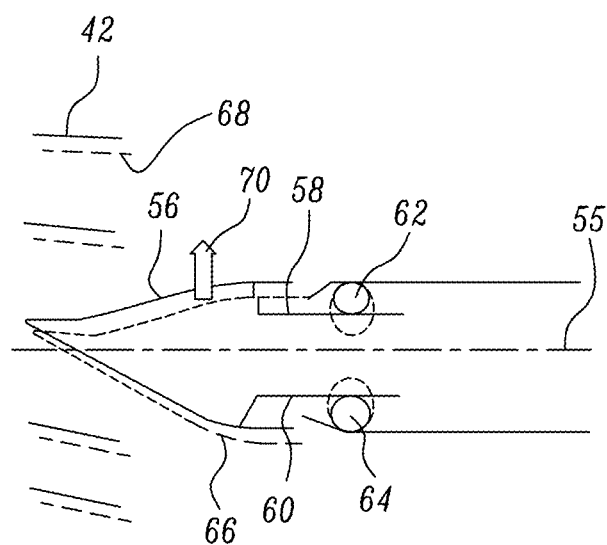
FIG. 6 is a schematic sectional view of the seal interface of FIG. 5 during engine running.

FIG. 6 shows a corresponding view of the seal 54 to that of FIG. 5 but in an operational state when a rotor (for example, the fan assembly) is rotating about the principal engine axis 9. In this generic, or average/cruise, operational state all seals at nominal compression and aerodynamic surfaces perfectly aligned.

Due to the torque reaction of the engine, the OGVs 42 and the nacelle 21 are rotated/displaced relative to the pylon 50 and move in the direction of arrow 70. The dashed lines show the bifurcation 56 in the static state 66 of FIGS. 5 and 42 for 68 in the static state for comparison.

The movement of the nacelle 21 and/or the OGV 42 results in movement of the first member 58 and the second member 60 in unison relative to the central axis 55 of the static structure 51. This results in an increase in the compression of the first seal portion 62 and a reduction in the compression of second seal portion 64, such that the difference in compression between the first and second seal portions is reduced. Therefore, the opposing seals are closer to an equilibrium state when the engine is operational.

The offset in the static state required to yield a particular offset in a given mobile state can be calculated based on the predicted rotation of the OGVs 24 and/or the nacelle 21 for the given operational state.

In an example, the offset in the static state is configured such that when the engine is in a cruise state, the offset is reduced to substantially zero. Therefore, the difference in compression of the first and second seal portions is substantially zero and the compression of the first and second seal portions are equal. The nominal compression of the first and second members in this state may be in the region of 20-50%, e.g. 30-40%, such as approximately 35%. All seals may be at a target nominal compression of e.g. 35-40% at the desired operating condition.

In an alternative example, the offset in the static state is configured such that the when the engine is at maximum thrust state, the offset is substantially zero.

It is beneficial that the seal compressions are always positive for both seals when at-rest, during cruise and/or at maximum thrust, i.e. across the whole operating range. This can serve to ensure a desired operational life of the seal. The examples of nominal compression given above may be tailed to be compliant with desirable fatigue seal compression thresholds. For example, maintaining each seal within a minimum compression of 10% and maximum compression of 60% at all times.

A method of constructing a seal for this interface example provided in FIGS. 5 and 6 comprises the following steps:
  Determining the predicted degree of rotation as a result of the reactive torque during the operational state (mechanical and thermal deflections)
  Determining a radial distance from the axis of rotation for a given location
  Determining a displacement, e.g. an angular displacement, a circumferential distance (i.e. the arc length) or lateral distance moved at the given location from the degree of rotation during the operational state and the radial distance.
  Providing a seal at the interface between the engine and pylon.
  Offsetting the nacelle/splitter relative to the pylon by a magnitude of less than or equal to the displacement in an opposing direction to the direction of rotation.

The above disclosure concerns the seal at the splitter/bifurcation 56 and/or at the interface between the nacelle 21 and pylon 50. Both of those interfaces have in common that they require sealing on opposing sides of a structure with respect to the direction of rotation of the engine in use. That is to say, one side faces toward the direction of rotation and the other side faces away from the axis of rotation. Other seals that fulfil this requirement could be considered.

Furthermore, whilst the above disclosure concerns offset/displacement in the circumferential direction, further implementations of the disclosure could accommodate axial separation between the adjacent components between at-rest and operational conditions. The first and second seal portion may be axially spaced to accommodate axial movement of the splitter 56 therebetween. The seals would be offset in the axial direction in an opposing direction to the relative movement. In an example, the seal 54 may accommodate the axial movement of the engine due to the thrust of the engine or increasing axial deflections from the hub to tip of the OGV.

The seal accommodates a relative rotation between a gas turbine engine and the pylon of an aircraft frame.

A seal of reduced diameter or size may be provided for a given torque wind up. Additionally or alternatively a predetermined seal size/diameter may be used to accommodate a larger torque wind up, e.g. as associated with a geared turbofan engine architecture. For example, it has been found that a conventional 2" (5.08 cm) seal can be used to accommodate an increase in acceptable total torque wind up from 0.5" (1.27 cm) to 0.9" (2.286 cm).

The seal may improve powerplant performance by making the seal interfaces more tolerant to mechanical and thermal deflections and so enabling reduced engine structural stiffness (e.g. reduced weight) in relevant components, such as structural vanes.

Implementation of the seal may allow all mating aerodynamic surfaces to be matched/aligned during key parts of the flight cycle for improved fuel burn performance, e.g. by minimising aerodynamic steps and/or gaps and associated excrescence losses. The seal and matching aerodynamic surfaces reduce duct losses and overboard seal leakage during the cruise state, to improve fuel burn efficiency.

The seal may be used to reduce the weight of the outlet guide vanes required to counteract torque wind up.

Whilst, the present disclosure has been disclosed in terms of a seal between a nacelle of a gas turbine engine and a pylon of an aircraft, it can be appreciated the seal of the present disclosure may be used in to form a seal in any situations where a component subject to a relative movement/rotation interfaces with a fixed/static structure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A seal assembly for a gas turbine engine having a rotor arranged to rotate about an axis in use, the seal assembly comprising:
   a static support structure comprising a pylon for the gas turbine engine;
   a casing structure of the engine, wherein rotation of the engine rotor causes a deflection of the casing structure relative to the static support structure in a first direction due to reactive torque in components interior to the casing structure of the engine; and
   a seal at an interface between the static support structure and the casing structure, and comprising a first seal portion and a second seal portion spaced from one another in the first direction, wherein the first seal portion is provided against a first surface of the casing structure and the second seal portion is provided against a second surface of the casing structure opposing the first surface;
   where in an at-rest state in which the engine is not operational, the first and second surfaces are offset from an equilibrium position with respect to the static support structure such that there is a difference in compression of the first seal portion and the second seal portion between the static support structure and the casing structure, said offset being in a direction opposite to the first direction.

2. The seal assembly according to claim 1, wherein the first direction corresponds with a direction of rotation of the rotor.

3. The seal according to claim 1, where the first seal portion is downstream of the second seal portion in the first direction and/or direction of rotation of the rotor and the second seal portion is compressed to a greater extent in the at-rest state than the first seal portion.

4. The seal assembly according to claim 1, where in an operational state of the engine in which the rotor is rotating the offset of the first and second surfaces from the equilibrium position is reduced or zero.

5. The seal assembly according to claim 1, where the static support structure comprises a first opposing surface and a second opposing surface, said first seal portion being compressed between the first surface of the casing structure and the first opposing surface of the static support structure and/or said second seal portion being compressed between the second surface of the casing structure and the second opposing surface of the static support structure.

6. The seal assembly according to claim 5, wherein the offset comprises an offset of the first and second surfaces relative to the first and second opposing surfaces in the at-rest state.

7. The seal assembly according to claim 1, where the casing structure comprises an engine nacelle and/or bifurcation of a bypass flow passage of the engine, the seal extending along an interface between the static support structure and the nacelle and/or bifurcation.

8. The seal assembly according to claim 1, where the nominal compression of the first seal portion is 10-35% in the at-rest state and/or the nominal compression of the second seal portion is 40-60% in the at-rest state.

9. The seal assembly according to claim 8, where the nominal compression of the first seal portion is 15% in the at-rest state and/or the nominal compression of the second seal portion is 55% in the at-rest state.

10. The seal assembly according to claim 1, where a difference in nominal compression of the first seal portion and second seal portion is between 20% and 50% in the at-rest state.

11. The seal assembly according to claim 1, where the offset is 0.1-15 mm in the at-rest state.

12. The seal assembly according to claim 1, where the offset is tailored to be zero for an operational state being a cruise state of the engine and/or where the nominal compression of both the first and second seal portions is 35-40% for said operational state.

13. The seal assembly according to claim 1, where the first and/or second seal portion are provided at an interface between fluid-washed surfaces of the static support structure and the casing structure, said fluid-washed surface being misaligned or offset in the at-rest state and/or aligned in an operational state.

14. A gas turbine engine for an aircraft, the gas turbine engine comprising a seal assembly according to claim 1.

15. The gas turbine engine according to claim 14, further comprising:
an engine core comprising a turbine, a compressor, and a core shaft connecting the turbine to the compressor;
a fan located upstream of the engine core, the fan comprising a plurality of fan blades;
a gearbox that receives an input from the core shaft and outputs drive to the fan so as to drive the fan at a lower rotational speed than the core shaft.

16. The gas turbine engine according to claim 15, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

* * * * *